United States Patent [19]

Sufrin

[11] Patent Number: 5,330,683
[45] Date of Patent: Jul. 19, 1994

[54] METHOD OF INHIBITING CORROSION IN BRINE SOLUTIONS

[75] Inventor: Barry W. Sufrin, Naperville, Ill.

[73] Assignee: NALCO Chemical Company, Naperville, Ill.

[21] Appl. No.: 79,702

[22] Filed: Jun. 17, 1993

Related U.S. Application Data

[63] Continuation of Ser. No. 870,642, Apr. 16, 1992, abandoned.

[51] Int. Cl.$^5$ .......................... C23F 11/12; C23F 11/14
[52] U.S. Cl. ....................................... 252/387; 252/68; 252/75; 252/77; 252/78.1; 422/7; 422/12; 422/13; 422/14; 422/16
[58] Field of Search .......................... 252/68, 77, 79, 75, 252/78.1, 394, 396, 387; 422/7, 12, 13, 14, 16

[56] References Cited

U.S. PATENT DOCUMENTS

| | | | |
|---|---|---|---|
| 2,926,174 | 2/1960 | Linn | 252/396 |
| 3,589,859 | 6/1971 | Foroulis | 252/396 |
| 3,711,246 | 1/1973 | Foroulis | 252/396 |
| 3,783,631 | 1/1974 | Modahl et al. | 252/69 |
| 3,962,109 | 6/1976 | Oberhofer et al. | 252/396 |
| 4,219,433 | 8/1980 | Manabe et al. | 252/396 |
| 4,225,351 | 9/1980 | Zuendt et al. | 252/396 |
| 4,311,024 | 1/1982 | Itoh et al. | 252/68 |
| 4,470,272 | 9/1984 | Itoh et al. | 252/68 |
| 4,508,684 | 4/1985 | Huff et al. | 252/68 |
| 4,869,841 | 8/1989 | Matteodo et al. | 252/396 |

FOREIGN PATENT DOCUMENTS 63-079723A  4/1988  Japan.
1174457A  8/1985  U.S.S.R.

OTHER PUBLICATIONS

*Corrosion Inhibition in Lithium Bromide Absorption Refrigeration Systems,* Dockus et al., Ashrae Semi-annual Meeting, Feb. 11–14, 1963, N.Y., N.Y.

Primary Examiner—Robert L. Stoll
Assistant Examiner—Valerie Fee
Attorney, Agent, or Firm—Robert A. Miller; Barry W. Sufrin; Joseph B. Barrett

[57] ABSTRACT

An environmentally acceptable and economically appealing method of inhibiting corrosion in brine solution systems wherein an aqueous brine solution is treated with gluconate or sorbitol.

20 Claims, No Drawings

METHOD OF INHIBITING CORROSION IN BRINE SOLUTIONS

This application is a continuation of application Ser. No. 07/870,642, filed on apr. 16, 1992, now abandoned.

BACKGROUND OF THE INVENTION

Corrosion occurs when metals are oxidized to their respective ions or insoluble salts. For example, corrosion of metallic iron involves conversion to soluble iron An a +2 or +3 oxidation state or to formation of insoluble iron oxides and hydroxides. Metal loss from the solubilization of the iron can cause the structural integrity of the system to deteriorate over time. This can cause leakage between the water system and process streams. Also, the formation of insoluble salts in the corrosion process can produce a build-up of deposits which impede heat transfer and fluid flow.

Aqueous brine solutions are commonly used as refrigeration media. However, brine solutions have a significant corrosive effect on metals. Therefore, in order to reduce the extent of corrosion when brine solutions are used as refrigeration media, corrosion inhibitors typically are added to the brine solutions.

Chromate has traditionally been an extremely widely used and effective corrosion inhibitor. During recent years, however, the use of chromate has come under increasing scrutiny due to environmental concerns. Unfortunately, phosphates, which are generally excellent corrosion inhibitors, are undesirable in this application as well since they generally lead to unacceptable levels of scale formation. Similarly, nitrites may also not be used since they change the nature of corrosion from general to localized. The localized corrosion formed in presence of nitrite can cause perforation in a relatively short time.

Two corrosion inhibitors which have been used extensively in fresh water systems are gluconate and sorbitol. They have been used as corrosion inhibitors in fresh-water systems at levels up to 100 parts per million (ppm). It has never been suggested use gluconate or sorbitol An brine systems, since brines may produce a different type of corrosion (pitting or localized corrosion) than encountered in fresh-water systems.

Therefore, it would be highly desirable to develop a new method of inhibiting corrosion in brine solution systems which is environmentally acceptable, economical, and will inhibit localized corrosion or scale formation.

SUMMARY OF THE INVENTION

This invention relates generally to corrosion inhibitors, and more particularly, to a method of inhibiting corrosion in brine solution systems.

The method of the invention comprises treating an aqueous brine solution with a level of gluconate or sorbitol far above any heretofore used in any corrosion control application. The use of gluconate or sorbitol is environmentally acceptable, economically appealing, and does not lead to localized corrosion or scale formation.

DETAILED DESCRIPTION OF THE INVENTION

In a preferred embodiment of the present invention, gluconate is added to an aqueous brine solution to inhibit localized corrosion and scale formation. The gluconate should be present in the range of about 200 to 15,000 ppm by weight of the overall solution, and preferably at a level of at least about 2000 ppm. In a particularly preferred embodiment, the gluconate is present at a level of about 4130 ppm by weight of the overall solution.

In an alternative embodiment of the present invention, an alkane polyol corrosion inhibitor, such as mannitol or sorbitol, is added to the aqueous brine solution. Sorbitol is the preferred alkane polyol corrosion inhibitor. The alkane polyol should be present in the range of about 200 to 15,000 ppm by weight of the overall solution, and preferably at a level of at least about 2000 ppm.

In a further alternative embodiment of the present invention, a combination of gluconate and an alkane polyol corrosion inhibitor is added to the aqueous brine solution. The gluconate and alkane polyol should each be present in the range of about 900 to 2500 ppm by weight of the overall solution.

Borax, a buffering agent, may be added to the aqueous brine solution as a corrosion inhibitor for mild or carbon steel. If borax is used, it should be present in the range of about 100 to 3,500 ppm by weight of the overall solution, preferably in the range of about 300 to 800 ppm and most preferably at a level of about 400 ppm.

Tolyltriazole, mercaptobenzothiozole, or benzotriazole may be added to the aqueous brine solution as a corrosion inhibitor for yellow metals. Tolyltriazole is preferred. If tolyltriazole is used, it should be present in the range of about 5 to 400 ppm by weight of the overall solution, preferably in the range of about 30 to 100 ppm and most preferably at a level of 40 ppm.

Brines from the group comprising aqueous solutions of $CaCl_2$, $CaBr_2$, $KCl$, $KBr$, $LiCl$, $LiBr$, $MgCl_2$, $MgBr_2$, $NaCl$ and $NaBr$ may be treated in accordance with the invention. In a preferred embodiment, $CaCl_2$ brine is treated. $CaCl_2$ should be present in the brine in the range of about 10 to 35% by weight of the overall solution, preferably, in the range of about 20 to 30% and most preferably at a level of about 25%.

In an alternative embodiment, LiCl brine is used. The LiCl should be present in the range of about 10 to 45% by weight of the overall solution, preferably, in the range of about 20 to 35% and most preferably at a level of about 25%.

The present invention performs most effectively when the aqueous brine solution is in the temperature range of about $-20°$ to $300°$ F., preferably in the range of about $-20°$ F. to $140°$ F. and most preferably at about $90°$ F.

The pH for treating the aqueous brine solution in accordance with the present invention should be in the range of about 4 to 11, preferably in the range of about 5.5 to 9.5 and most preferably in the range of about 7 to 9.

EXAMPLE

The following example is intended to be illustrative of the present invention and to teach one of ordinary skill how to make and use the corrosion inhibitor composition. This example is not intended to limit the invention or its protection in any way.

25 to 30% $CaCl_2$ and LiCl solutions were treated with 2000 to 4130 ppm gluconate, 2000 to 2100 ppm sorbitol, 300 to 480 ppm borax and 11 to 39 ppm tolyltriazole. These solutions were tested at a temperature of $120°$ to $130°$ F. and in the pH range of 5.9 to 9.2. Gravimetric analyses were conducted to determine the corrosion rates.

The test conditions are recorded in the table below. Typical corrosion rates in untreated brine systems are approximately 5 to 6 mpy for a 30% CaCl$_2$ solution and about 6–8 mpy for a 20% CaCl$_2$ solution. As illustrated in the table below, the corrosion rates for mild steel and copper achieved using the present invention were 1.5 to 1.7 mpy and 0.1 mpy respectively.

TABLE

| Temperature (°F.) | 130 | 130 | 130 | 120 | 125 |
|---|---|---|---|---|---|
| Initial pH | 9.2 | 7.1 | 8.9 | 9.0 | 9.1 |
| Final pH | 6.5 | 5.9 | 6.2 | 6.3 | 8.9 |
| CaCl$_2$ (%) | 25 | 25 | 25 | 30 | — |
| LiCl$_2$ (%) | — | — | — | — | 25 |
| Corrosion Inhibitors (ppm) | | | | | |
| Gluconate | 4130 | 2030 | 2030 | 2000 | 2100 |
| Sorbitol | — | 2030 | 2030 | 2000 | 2100 |
| Borax | 330 | 330 | 330 | 210 | 300 |
| Tolyltriazole | 11 | 21 | 12 | 30 | 39 |
| Corrosion rate of mild steel (mpy) | 1.6,1.7 | 1.5,1.7 | 1.6,1.7 | — | 1.7,1.8 |
| Corrosion rate of copper (mpy) | — | — | — | 0.1 | — |

If the above procedure is followed using about 2000 ppm sorbitol, 300 to 400 ppm borax and 11 to 39 ppm tolyltriazole, but no gluconate, the corrosion rates for mild steel and copper would be satisfactorily reduced. The results, however, would not be as good as those obtained in the presence of gluconate.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A method of inhibiting corrosion in aqueous brine solution systems wherein a brine solution containing at least 100,000 ppm of a salt from the group consisting of calcium chloride, calcium bromide, potassium chloride, potassium bromide, lithium chloride, magnesium chloride, magnesium bromide, sodium chloride, and sodium bromide is treated with at least 200 ppm by weight gluconate and at least 200 ppm of an alkane polyol selected from the group consisting of sorbitol and mannitol.

2. The method of claim 1 in which the level of gluconate ranges from about 200 to 15,000 ppm by weight of the overall solution.

3. The method of claim 2 in which the level of gluconate is at least about 2000 ppm by weight of the overall solution.

4. The method of claim 3 in which the level of gluconate is about 4130 ppm by weight of the overall solution.

5. The method of claim 1 in which the alkane polyol is mannitol.

6. The method of claim 1 in which the alkane polyol is sorbitol.

7. The method of claim 6 in which the level of sorbitol ranges from about 200 to 15,000 ppm by weight of the overall solution.

8. The method of claim 7 in which the level of sorbitol is at least about 2000 ppm by weight of the overall solution.

9. The method of claim 1 in which at least about 100 ppm of borax is introduced as a corrosion inhibitor for mild of carbon steel.

10. The method of claim 1 in which a corrosion inhibiting amount of a corrosion inhibitor for yellow metals chosen from the group consisting of polyol tolyltriazole, mercaptobenzothiozole and benzotriazole is introduced into the brine solution.

11. The method of claim 10 in which the corrosion inhibitor for yellow metals is tolyltriazole.

12. The method of claim 1 in which a 10 to 35% by weight aqueous brine solution is treated.

13. The method claim 1 in which the brine solution is CaCl$_2$.

14. The method of claim 1 in which the brine solution is LiCl.

15. The method of claim 1 in which the pH range of the brine solution ranges from about 4 to about 11.

16. The method of claim 15 in which the pH range of the brine solution ranges from about 5.5 to about 9.5.

17. The method of claim 16 in which the pH range of the brine solution ranges from about 7 to about 9.

18. The method of claim 1 in which a brine solution refrigeration system is treated.

19. A method of inhibiting corrosion in brine solution refrigeration systems comprising treating the brine solution with at least about 200 ppm gluconate, at least about 200 ppm sorbitol, at least about 100 ppm of borax, and at least about 5 ppm of a corrosion inhibitor for yellow metals.

20. The method of claim 19 in which the level of gluconate ranges from about 900 to 2500 ppm by weight of the overall solution, sorbitol ranges from about 900 to 2500 ppm by weight, borax ranges from about 300 to 800 ppm by weight, and the corrosion inhibitor for yellow metals ranges from about 30 to 100 ppm by weight.

* * * * *

UNITED STATES PATENT AND TRADEMARK OFFICE
CERTIFICATE OF CORRECTION

PATENT NO. : 5,330,683
DATED : July 19, 1994
INVENTOR(S) : Kaveh Sotoudeh

It is certified that error appears in the above-indentified patent and that said Letters Patent is hereby corrected as shown below:

Title page, item [75], inventor: should be Kaveh Sotoudeh, Naperville, Ill.
Title page, item [73], assignee: should be Nalco Chemical Company.

Signed and Sealed this

Twentieth Day of September, 1994

Attest:

BRUCE LEHMAN

*Attesting Officer*     *Commissioner of Patents and Trademarks*